(12) United States Patent
Inoue et al.

(10) Patent No.: US 10,945,075 B2
(45) Date of Patent: Mar. 9, 2021

(54) SOUND OUTPUT CONTROL DEVICE, SOUND OUTPUT CONTROL METHOD AND PROGRAM

(71) Applicant: PIONEER CORPORATION, Tokyo (JP)

(72) Inventors: Yusuke Inoue, Kawagoe (JP); Nobuaki Tanoue, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/485,922

(22) PCT Filed: Aug. 28, 2017

(86) PCT No.: PCT/JP2017/030756
§ 371 (c)(1),
(2) Date: Aug. 14, 2019

(87) PCT Pub. No.: WO2018/150611
PCT Pub. Date: Aug. 23, 2018

(65) Prior Publication Data
US 2020/0162819 A1  May 21, 2020

(30) Foreign Application Priority Data

Feb. 15, 2017  (JP) .............................. JP2017-026131

(51) Int. Cl.
*H04R 3/12* (2006.01)
*H04R 1/02* (2006.01)
(Continued)

(52) U.S. Cl.
CPC ............... *H04R 3/12* (2013.01); *H04R 1/025* (2013.01); *H04R 1/403* (2013.01);
(Continued)

(58) Field of Classification Search
CPC .......... H04R 3/12; H04R 1/025; H04R 1/403; H04R 2499/13; B60R 11/0205; B60R 2011/0003
(Continued)

(56) References Cited

U.S. PATENT DOCUMENTS

| 5,023,914 A | 6/1991 | Arnold |
| 2008/0049948 A1 | 2/2008 | Christoph et al. |

(Continued)

FOREIGN PATENT DOCUMENTS

| JP | 2007-282202 A | 10/2007 |
| JP | 2009-159385 A | 7/2009 |

(Continued)

OTHER PUBLICATIONS

International Search Report, dated Nov. 7, 2017, from corresponding PCT application No. PCT/JP2017/030756.
(Continued)

*Primary Examiner* — Vivian C Chin
*Assistant Examiner* — Douglas J Suthers
(74) *Attorney, Agent, or Firm* — Nixon & Vanderhye

(57) ABSTRACT

In the sound output control device, the sound output units arranged at left and right front parts and left and right rear parts output sound. The delay unit gives a delay to the sounds outputted by the sound output units arranged at the left and right rear parts. The control unit determines a delay amount based on acoustic characteristic of the sounds outputted by the sound output units and collected at each of left and right front listening positions and left and right rear listening positions, and sets the determined delay amount to the delay unit.

10 Claims, 13 Drawing Sheets

(51) Int. Cl.
*H04R 1/40* (2006.01)
*B60R 11/00* (2006.01)
*B60R 11/02* (2006.01)

(52) U.S. Cl.
CPC ... *B60R 11/0205* (2013.01); *B60R 2011/0003* (2013.01); *H04R 2499/13* (2013.01)

(58) Field of Classification Search
USPC .......................................................... 381/86
See application file for complete search history.

(56) References Cited

U.S. PATENT DOCUMENTS

| | | |
|---|---|---|
| 2009/0169028 A1 | 7/2009 | Ise |
| 2011/0058684 A1 | 3/2011 | Ohta et al. |
| 2014/0314256 A1 | 10/2014 | Fincham et al. |
| 2016/0014505 A1* | 1/2016 | Iseki ............ H04R 1/403 381/86 |

FOREIGN PATENT DOCUMENTS

| | | |
|---|---|---|
| JP | WO2009/144781 A1 | 12/2009 |
| JP | 2012-195791 A | 10/2012 |
| JP | 2016-119574 A | 6/2016 |
| WO | 2014/125581 A1 | 8/2014 |

OTHER PUBLICATIONS

Extended European Search Report issued in European Patent Application No. 17896873.1 dated Dec. 4, 2020.
Crockett, B. et al., "Next Generation Automotive Research and Technologies," Audio Engineering Society Convention Paper 6649, Presented at the 120th Convention, May 20-23, 2006, Paris, France.

* cited by examiner

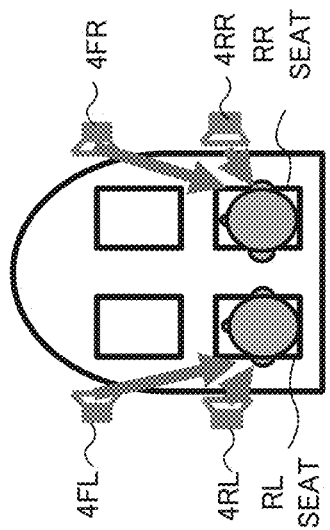
FIG. 4A
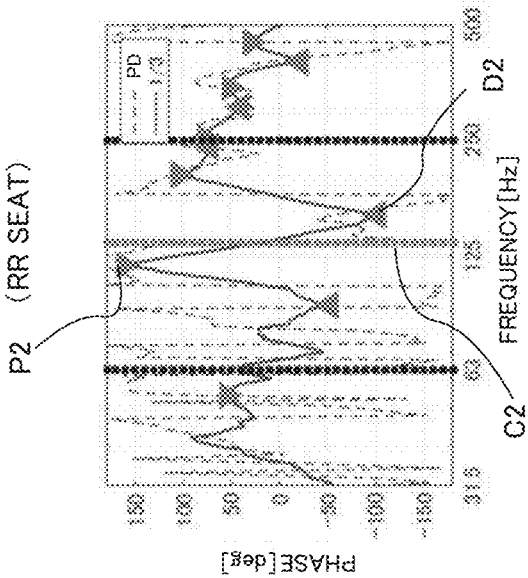
FIG. 4B (RL SEAT)
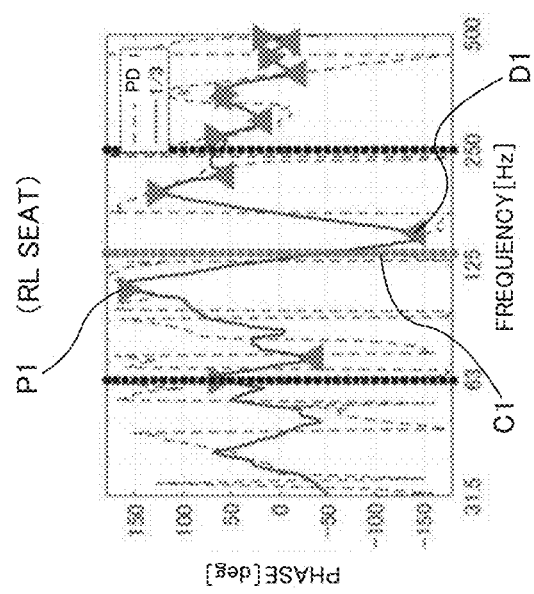
FIG. 4C (RR SEAT)

SOUND OUTPUT CONTROL DEVICE, SOUND OUTPUT CONTROL METHOD AND PROGRAM

TECHNICAL FIELD

The present invention relates to a technique of adjusting sound that a listener listens in a vehicle interior space.

BACKGROUND TECHNIQUE

There is proposed a technique of adjusting a sound pressure level of reproduced sound in an acoustic space such as a vehicle interior. For example, Patent Reference-1 discloses a sound field control device including a plurality of speakers, a plurality of microphones, a mode separation filter for mode-separating the sound pressure distribution, and a control filter which controls input signals to the plurality of speakers such that the mode amplitude of each separated mode becomes a predetermined value. This sound field control device measures a sound pressure distribution in the acoustic space, expresses the sound pressure distribution in the acoustic space by using a sine function and a cosine function of the space frequency of the mode subjected to the amplitude-control, corrects the mode space frequency such that the expressed sound pressure distribution becomes equivalent to the measured sound pressure distribution, and determines the filter coefficients of the mode separation filter based on the corrected mode space frequency.

PRIOR ART REFERENCES

Patent References

Patent Reference-1: Japanese Patent Application Laid-Open under No. 2009-159385

SUMMARY OF THE INVENTION

Problem to be Solved by the Invention

However, in the method of Patent Reference-1, large-scale calculation is needed to analyze the frequency characteristics. In case of a vehicle interior acoustic system having four speakers arranged at front-rear and left-right positions in the vehicle interior, the front and rear speakers influence the sound fields at the front and rear seats. Therefore, in order to control the acoustic characteristic of four seats in the vehicle interior, it is necessary to correct the sound field at each seat in consideration of the sound characteristic of each seat at the time of reproducing sound by four speakers.

The above is an example of the problem to be solved by the present invention. It is an object of the present invention to provide a technique of optimally correcting the sound field at each seat in the vehicle interior with minimizing mutual influence of the front and rear speakers.

Means for Solving the Problem

An invention described in claims is a sound output control device comprising: sound output units arranged at left and right front parts and left and right rear parts; a delay unit configured to give a delay to sounds outputted by the sound output units arranged at the left and right rear parts; and a control unit configured to determine a delay amount based on acoustic characteristic of the sounds outputted by the sound output units and collected at each of left and right front listening positions and left and right rear listening positions, and set the determined delay amount to the delay unit.

Another invention described in claims is a sound output control method executed by a sound output control device comprising sound output units arranged at left and right front parts and left and right rear parts, the method comprising: a delay process to give a delay to sounds outputted by the sound output units arranged at the left and right rear parts; and a control process to determine a delay amount based on acoustic characteristic of the sounds outputted by the sound output units and collected at each of left and right front listening positions and left and right rear listening positions, and set the determined delay amount to the delay unit.

Still another invention described in claims is a program executed by a sound output control device comprising: sound output units arranged at left and right front parts and left and right rear parts; and a computer, the program causing the computer to function as: a delay unit configured to give a delay to sounds outputted by the sound output units arranged at the left and right rear parts; and a control unit configured to determine a delay amount based on acoustic characteristic of the sounds outputted by the sound output units and collected at each of left and right front listening positions and left and right rear listening positions, and set the determined delay amount to the delay unit.

Still another invention described in claims is a sound output control device comprising: sound output units arranged at left and right front parts and left and right rear parts; a determination unit configured to determine a first frequency band based on collection result of collecting sounds outputted by the sound output units at a rear listening position; a delay unit configured to give a delay to the sounds outputted from the sound output units arranged at the left and right rear parts; and a control unit configured to determine a delay amount by detecting a sound pressure level, in the first frequency band, of the sounds outputted from the sound output units at each of the left and right front listening positions and the left and right rear listening positions, and sets the determined delay amount to the delay unit.

Still another invention described in claims is a sound output control method executed by a sound output control device comprising sound output units arranged at left and right front parts and left and right rear parts, the method comprising: a determination process to determine a first frequency band based on collection result of collecting sounds outputted by the sound output units at a rear listening position; a delay process to give a delay to the sounds outputted from the sound output units arranged at the left and right rear parts; and a control process to determine a delay amount by detecting a sound pressure level, in the first frequency band, of the sounds outputted from the sound output units at each of the left and right front listening positions and the left and right rear listening positions, and sets the determined delay amount to the delay unit.

Still another invention described in claims is a program executed by a sound output control device comprising sound output units arranged at left and right front parts and left and right rear parts; and a computer, the program causing the computer to function as: a determination unit configured to determine a first frequency band based on collection result of collecting sounds outputted by the sound output units at a rear listening position; a delay unit configured to give a delay to the sounds outputted from the sound output units arranged at the left and right rear parts; and a control unit configured to determine a delay amount by detecting a sound pressure level, in the first frequency band, of the sounds outputted from the sound output units at each of the left and right front listening positions and the left and right rear listening positions, and sets the determined delay amount to the delay unit.

BRIEF DESCRIPTION OF THE DRAWINGS

FIGS. 4A to 4C are diagrams explaining an example of analyzing band determination processing.

DETAILED DESCRIPTION OF THE PREFERRED EMBODIMENTS

Figure 1A:
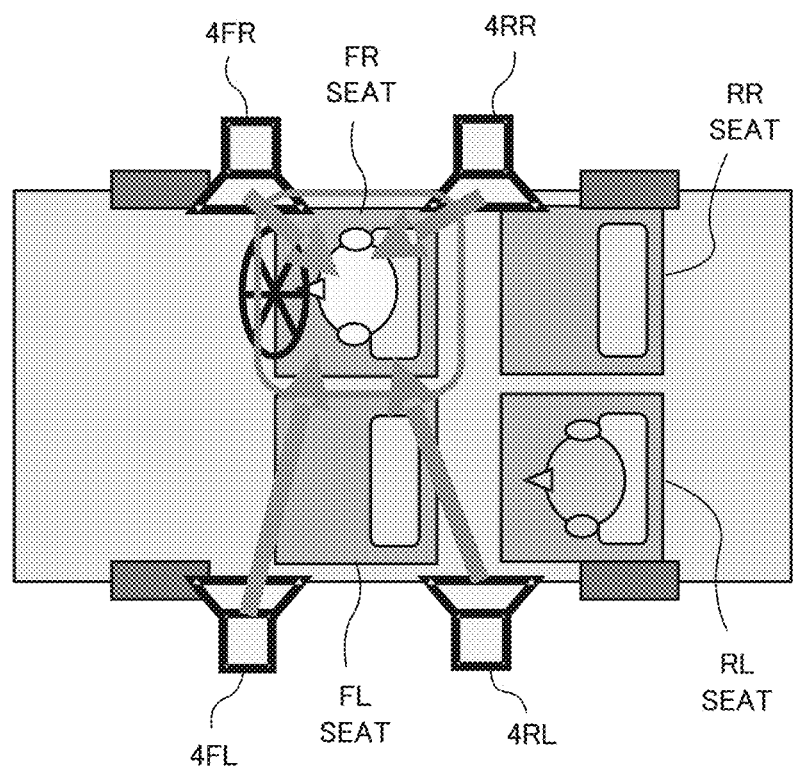
FIGS. 1A and 1B illustrate configuration examples of speakers in a vehicle interior.

According to one aspect of the present invention, there is provided a sound output control device comprising: sound output units arranged at left and right front parts and left and right rear parts; a delay unit configured to give a delay to sounds outputted by the sound output units arranged at the left and right rear parts; and a control unit configured to determine a delay amount based on acoustic characteristic of the sounds outputted by the sound output units and collected at each of left and right front listening positions and left and right rear listening positions, and set the determined delay amount to the delay unit.

In the above sound output control device, the sound output units arranged at left and right front parts and left and right rear parts output sound. The delay unit gives a delay to the sounds outputted by the sound output units arranged at the left and right rear parts. The control unit determines a delay amount based on acoustic characteristic of sounds outputted by the sound output units and collected at each of left and right front listening positions and left and right rear listening positions, and sets the determined delay amount to the delay unit. Thus, at each of the left and right front listening positions and the left and right rear listening positions, it is possible to optimize the mutual influence between the sound output units arranged at the left and right front parts and the sound output units arranged at the left and right rear parts.

One mode of the above sound output control device further comprises a determination unit configured to determine a controlled frequency band based on collection result of collecting the sounds outputted by the sound output units at the rear listening positions, and the control unit determines the delay amount based on the acoustic characteristic in the controlled frequency band. In this mode, for the controlled frequency band thus determined, it is possible to optimize the mutual influence between the sound output units arranged at the left and right front parts and the sound output units arranged at the left and right rear parts, at the left and right front listening positions as the left and right rear listening positions.

In another mode of the above sound output control device, the determination unit determines, as the controlled frequency band, the frequency band in which a phase characteristic of the sounds outputted from the sound output unit arranged at the left and right front parts and the phase characteristic of the sounds outputted from the sound output units arranged at the left and right rear parts become reverse phases. Thus, the sound pressure level can be controlled at the frequency band in which the phase characteristics of the sounds outputted from the front and rear sound output units become reverse phases. It is noted that "the frequency band in which the phase characteristics become reverse phases" includes the ranges of 120 to 240 degrees or −120 to −240 degrees.

In still another mode of the above sound output control device, the acoustic characteristic is a phase difference between a transfer characteristic from the sound output units arranged at the front parts to the listening positions and the transfer characteristic from the sound output units arranged at the rear parts to the listening positions. In this mode, the delay amount is determined based on the phase difference.

In still another mode of the above sound output control device, the control unit changes the delay amount of the delay unit, and determines the delay amount with which a difference of the phase differences detected at each of the left and right front listening positions and the left and right rear listening positions becomes minimum. In this mode, the difference of the phase differences at the left and right front listening positions and the left and right rear listening positions may be minimized.

In still another mode of the above sound output control device, the control unit determines the delay amount with which a standard deviation of the phase differences detected at each of the left and right front listening positions and the left and right rear listening positions becomes minimum. In this mode, the delay amount is determined by using the standard deviation.

In still another mode of the above sound output control device, the acoustic characteristic is the sound pressure level of the sounds outputted from the sound output units. In this mode, the delay amount is determined based on the sound pressure level.

In still another mode of the above sound output control device, the control unit changes the delay amount of the delay unit, and determines the delay amount with which a difference of sound pressure levels detected at each of the left and right front listening positions and the left and right rear listening positions becomes minimum. In this mode, it is possible to minimize the difference of the sound pressure levels at the left and right front listening positions and the left and right rear listening positions, due to the mutual influence between the sound output units arranged at the left and right front parts and the sound output units arranged at the left and right rear parts.

In still another mode of the above sound output control device, the control unit determines the delay amount with which a standard deviation of a sound pressure level detected at each of the left and right front listening positions and the left and right rear listening positions becomes minimum. In this mode, the delay amount is determined by using the standard deviation.

In still another mode of the above sound output control device, the control unit changes the delay amount of the delay unit up to a predetermined upper limit value. In this mode, by limiting the variation of the delay amount of the delay unit to the predetermined upper limit value, operational processing may be efficient. In a preferred example, the upper limit value is given by:

(the upper limit value of the delay amount)=½× (1/ (an analyzing object frequency)).

In a preferred example, the rear listening positions are located rearward of the sound output units arranged at the left and right rear parts. Also, in a preferred example, the above sound output control device is loaded on a vehicle.

According to another aspect of the present invention, there is provided a sound output control method executed by a sound output control device comprising sound output units arranged at left and right front parts and left and right rear parts, the method comprising: a delay process to give a delay to sounds outputted by the sound output units arranged at the left and right rear parts; and a control process to determine a delay amount based on acoustic characteristic of the sounds outputted by the sound output units and collected at each of left and right front listening positions and left and right rear listening positions, and set the determined delay amount to the delay unit. By this method, at each of the left and right front listening positions and the left and right rear listening positions, it is possible to optimize the mutual influence between the sound output units arranged at the left and right front parts and the sound output units arranged at the left and right rear parts.

According to still another aspect of the present invention, there is provided a program executed by a sound output control device comprising: sound output units arranged at left and right front parts and left and right rear parts; and a computer, the program causing the computer to function as: a delay unit configured to give a delay to sounds outputted by the sound output units arranged at the left and right rear parts; and a control unit configured to determine a delay amount based on acoustic characteristic of the sounds outputted by the sound output units and collected at each of left and right front listening positions and left and right rear listening positions, and set the determined delay amount to the delay unit. By executing the program by the computer, the above sound output control device can be realized. This program can be handled in a manner stored in a storage medium.

According to still another aspect of the present invention, there is provided a sound output control device comprising: sound output units arranged at left and right front parts and left and right rear parts; a determination unit configured to determine a first frequency band based on collection result of collecting the sounds outputted by the sound output units at a rear listening position; a delay unit configured to give a delay to the sounds outputted from the sound output units arranged at the left and right rear parts; and a control unit configured to determine a delay amount by detecting a sound pressure level, in the first frequency band, of the sounds outputted from the sound output units at each of the left and right front listening positions and the left and right rear listening positions, and sets the determined delay amount to the delay unit.

The above sound output control device first collects, at the rear listening position, the sounds outputted by the sound output units arranged at the left and right front parts and the left and right rear parts, and determines the first frequency band. Next, the sound output control device gives a delay to the sounds outputted from the sound output units, and outputs the sound from the sound output units. Then, the sound output control device determine a delay amount by detecting a sound pressure level, in the first frequency band, of the sounds outputted from the sound output units at each of the left and right front listening positions and the left and right rear listening positions, and sets the determined delay amount to the delay unit. Thus, it is possible to optimize the sound pressure level in the first frequency band at each of the left and right front listening positions and the left and right rear listening positions.

In one mode of the above sound output control device, the determination unit determines, as the first frequency band, the frequency band in which a phase characteristic of the sounds outputted from the sound output units arranged at the left and right front parts and the phase characteristic of the sounds outputted from the sound output units arranged at the left and right rear parts become reverse phases. Thus, the sound pressure level can be controlled at the frequency band in which the phase characteristics of the sounds outputted from the front and rear sound output units become reverse phases. It is noted that "the frequency band in which the phase characteristics become reverse phases" includes the ranges of 120 to 240 degrees or −120 to −240 degrees.

In another mode of the above sound output control device, the control unit changes the delay amount of the delay unit, and determines the delay amount with which a difference of sound pressure levels detected at each of the left and right front listening positions and the left and right rear listening positions becomes minimum. In this mode, the difference of the sound pressure levels at the left and right front listening positions and the left and right rear listening positions may be minimized.

In still another mode of the above sound output control device, the control unit determines the delay amount with which a standard deviation of a sound pressure level detected at each of the left and right front listening positions and the left and right rear listening positions becomes minimum. In this mode, the delay amount is determined by using the standard deviation.

In still another mode of the above sound output control device, the control unit changes the delay amount of the delay unit up to a predetermined upper limit value. In this mode, by limiting the variation of the delay amount of the delay unit to the predetermined upper limit value, operational processing may be efficient. In a preferred example, the upper limit value is given by:

(the upper limit value of the delay amount [sec])=½×(1/ (an analyzing object frequency [Hz])).

In a preferred example, the rear listening positions are located rearward of the left and right rear parts. In a preferred example, the above sound output control device is loaded on a vehicle.

According to still another aspect of the present invention, there is provided a sound output control method executed by a sound output control device comprising sound output units arranged at left and right front parts and left and right rear parts, the method comprising: a determination process to determine a first frequency band based on collection result of collecting the sounds outputted by the sound output units at a rear listening position; a delay process to give a delay to the sounds outputted from the sound output units arranged at the left and right rear parts; and a control process to determine a delay amount by detecting a sound pressure level, in the first frequency band, of the sounds outputted from the sound output units at each of the left and right front listening positions and the left and right rear listening positions, and sets the determined delay amount to the delay unit. By this method, at each of the left and right front listening positions and the left and right rear listening positions, the sound pressure level in the first frequency band may be optimized.

According to still another aspect of the present invention, there is provided a program executed by a sound output control device comprising sound output units arranged at left and right front parts and left and right rear parts; and a computer, the program causing the computer to function as: a determination unit configured to determine a first frequency band based on collection result of collecting the sounds outputted by the sound output units at a rear listening position; a delay unit configured to give a delay to the sounds outputted from the sound output units arranged at the left and right rear parts; and a control unit configured to determine a delay amount by detecting a sound pressure level, in the first frequency band, of the sounds outputted from the sound output units at each of the left and right front listening positions and the left and right rear listening positions, and sets the determined delay amount to the delay unit. By executing the program by the computer, the above sound output control device can be realized. This program can be handled in a manner stored in a storage medium.

Embodiments

Preferred embodiments of the present invention will be described below with reference to the accompanied drawings.

Principle Explanation

Figure 1B:
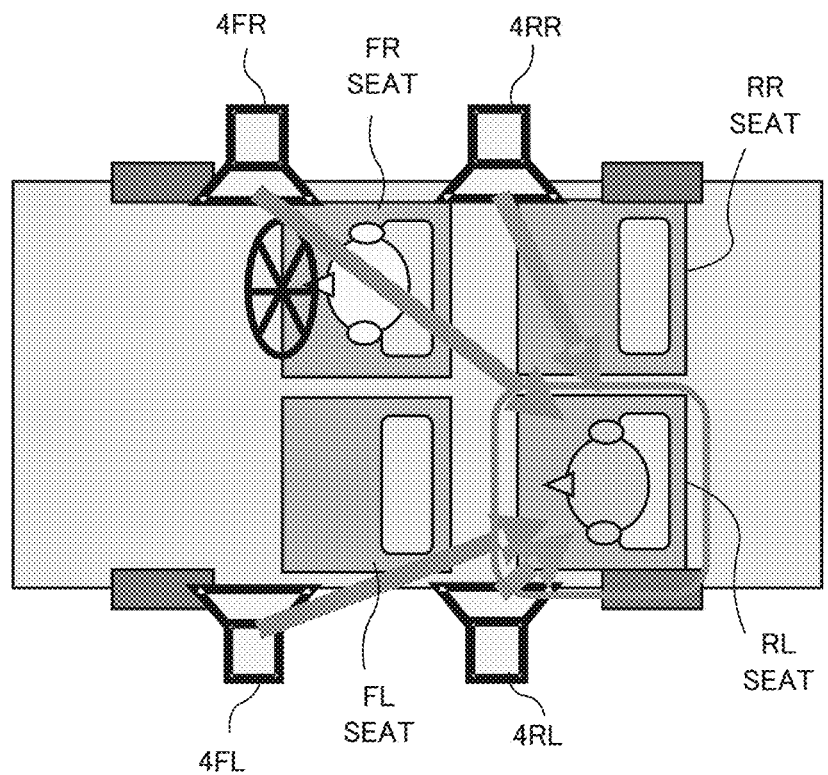

FIGS. 1A and 1B illustrate a configuration example of speakers in a vehicle interior. As shown in FIG. 1A, it is supposed that a vehicle interior includes a front-right seat (hereinafter referred to as "FR seat"), a front-left seat (hereinafter referred to as "FL seat"), a rear-right seat (hereinafter referred to as "RR seat") and a rear-left seat (hereinafter referred to as "RL seat"). Also, a front-right speaker 4FR is arranged at the front right of the FR seat, a front-left speaker 4FL is arranged at the front left of the FL seat, a rear-right speaker 4RR is arranged at the front right of the RR seat, and a rear-left speaker 4RL is arranged at the front left of the RL seat.

Here, when sounds are reproduced from the four speakers as shown in FIG. 1A, the sound field created at the FR seat is affected by all the four speakers. Also, as shown in FIG. 1B, the sound field created at the RL seat is affected by all the four speakers. Therefore, in order to control the acoustic characteristics at the four seats, it is necessary to correct the sound fields of the four seats in consideration of the acoustic characteristics of the four seats when the four speakers are reproduced.

In a conventional method of correcting the sound fields of the four seats, first only the front speakers are reproduced, and the sound fields of the front two seats are corrected to be substantially uniform and the sound fields of the rear two seats are corrected to be substantially uniform. Next, only the rear speakers are reproduced, and the sound fields of the front two seats are corrected to be substantially uniform and the sound fields of the rear two seats are corrected to be substantially uniform. However, when all the speakers, i.e., the front speakers and the rear speakers are reproduced at the same time in this state, the frequency characteristics at the four seats become different. Specifically, at a certain frequency band, due to the relation of the phases of the sounds outputted by the four speakers, the sounds outputted by the front and rear speakers are overlapped (added) so that the sound pressure level becomes large at the two front seats, and the sounds outputted by the front and rear speakers are canceled with each other (subtracted) so that the sound pressure level becomes small at the two rear seats. As a result, the sound pressure levels at the two front seats and the two rear seats have a large difference. Since the difference is caused by the positions of the front and rear speakers and reflection in the vehicle interior, in a frequency band in which the phase characteristics from the front and rear speakers are different at the two front seats and the two rear seats, it is difficult to perform correction which satisfies the acoustic characteristics of all the four seats in the vehicle interior by equalizer processing.

In this view, in the following embodiments, the correction is performed to make the sound fields at the four seats uniform when the sound is reproduced by all the speakers. Specifically, (1) first the frequency band in which the phase characteristics of the front speakers and the rear speakers become reverse phases at the rear seats is determined, and (2) then the output timing from the rear speakers is changed such that the sound fields of all the four seats become uniform.

Device Configuration

Figure 2:
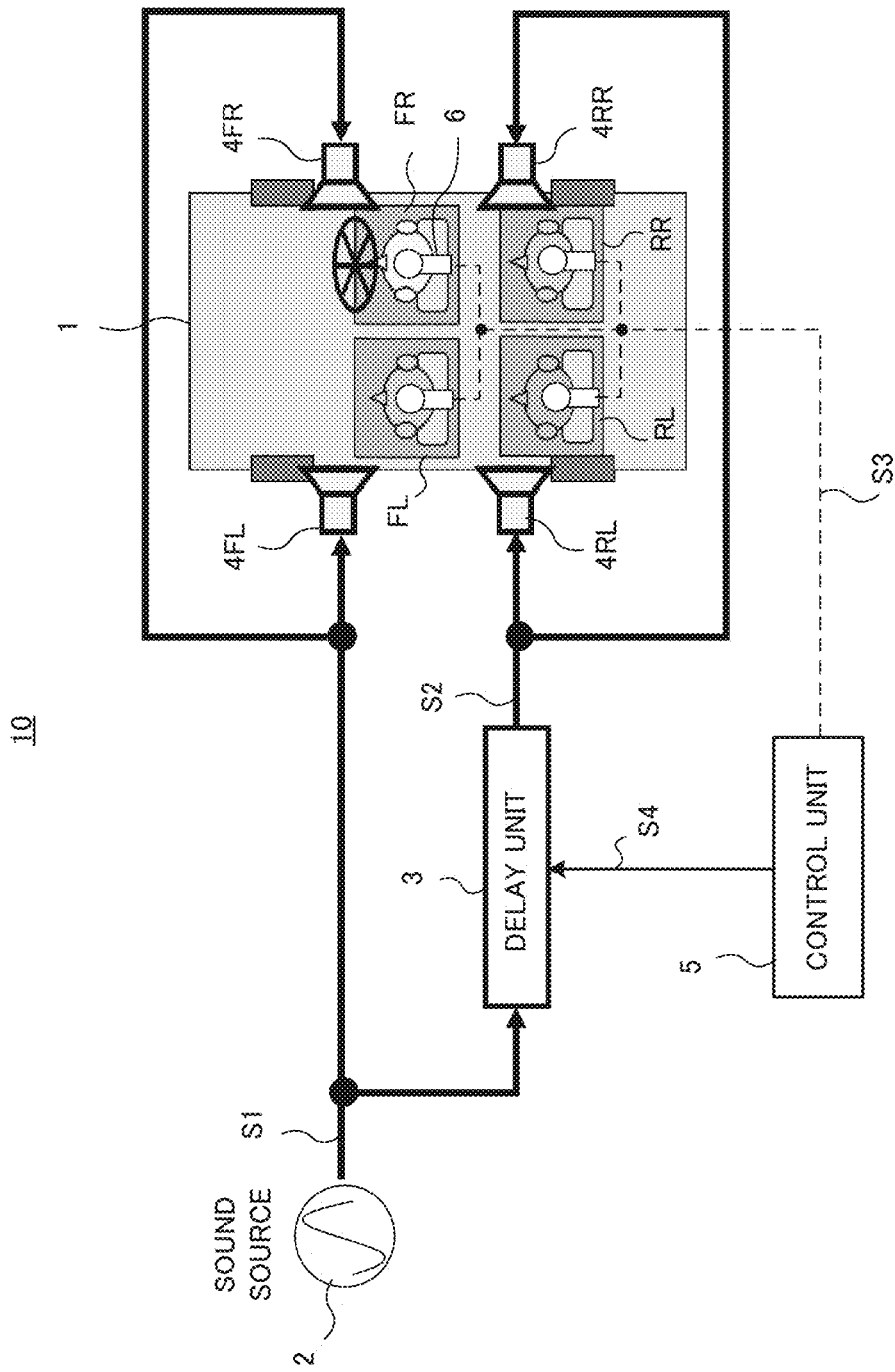
FIG. 2 illustrates a sound field control device according to embodiments.

FIG. 2 illustrates a configuration of a sound field control device according to embodiments. The sound field control device 10 is mounted on a vehicle 1, and includes a sound source 2, a delay unit 3, four speakers 4FL, 4FR, 4RL and 4RR, a control unit 5, and microphones 6 arranged at the four seats in the vehicle interior.

At the time of adjusting the sound field, the sound source 2 outputs a test signal S1 such as white noise. The test signal S1 is directly supplied to the front speakers 4FL and 4FR, and supplied to the delay unit 3. The delay unit 3 delays the test signal S1 by a predetermined delay amount to produce delayed test signal S2, and supplies the delayed test signal S2 to the rear speakers 4RL and 4RR. Thus, the sound corresponding to the test signal S1 is outputted from the front speakers 4FL and 4FR, and the sound corresponding to the test signal S1 delayed, i.e., delayed test signal S2, by the predetermined delay amount is outputted from the rear speakers 4RL and 4RR. The microphone 6 arranged at each seat collects the sound at each seat, and supplies the signal S3 to the control unit 5. While the signals from the four microphones 6 are shown by a single broken line in FIG. 2, actually the signal S3 of the sound collected at each seat is separately supplied to the control unit 5. Namely, the four signals S3 of the sounds collected at the four seats are supplied to the control unit 5. In the example of FIG. 2, the reproduced sound in the vehicle interior is collected by the single microphone 6 arranged at the position of a head of a listener sitting on each seat. Instead, the positions of both ears of the listener may be used as evaluation points, and the signal S3 may be generated by adding the signals of the sounds collected by the microphones arranged at the positions of the left and right ears.

The control unit 5 determines the delay amount based on the signals S3 obtained at the four seats, and supplies the signal S4 indicating the delay amount to the delay unit 3. Thus, the delay unit 3 is controlled to delay the test signal S1 by the delay amount determined by the control unit 5.

In the above configuration, the FL seat and the FR seat are examples of the front listening positions of the present invention, and the RL seat and the RR seat are examples of the rear listening positions of the present invention. The speaker 4 is an example of a sound output unit of the present invention, and the control unit 5 is an example of the determination unit and the control unit of the present invention.

Sound Field Control

Next, the sound field control by the sound field control device 10 will be described in detail. As described above, the control unit 5 determines the delay amount based on the signals S3 of the sounds collected in the vehicle interior, and sets it to the delay unit 3.

1st Embodiment

First, a first embodiment of the sound field control will be described.

Delay Amount Calculation Processing

The delay amount calculation processing roughly includes "the analyzing band determination processing" and "the delay amount calculation processing".

"The analyzing band determination processing" determines a frequency band in which the phase characteristic of the reproduced sounds outputted from the front speakers and the phase characteristic of the reproduced sounds outputted from the rear speakers become reverse phases. As described above, at a certain frequency band, since the reproduced sounds outputted from the front speakers and the reproduced sounds outputted from the rear speakers have different phase characteristics at the two front seats and the two rear seats, the two front seats have such a sound field that those reproduced sounds are added, and the two rear seats have such a sound field that those reproduced sounds are subtracted. Therefore, first the frequency band in which the phase characteristics become reverse phases is determined. Specifically, the reproduced sound from the front speakers and the reproduced sound from the rear speakers are collected at the listening position at the rear seats to obtain the phase characteristics, and the frequency band in which those phase characteristics become reverse phases is determined as "an analyzing band". "The analyzing band" corresponds to the controlled frequency band in the present invention.

"The delay amount calculation processing" calculates the delay amount given to the sound reproduced from the rear speakers based on the level of the sound in the above analyzing band. Here, the delay amount is calculated such that the difference between the sound pressure levels in the analyzing band at the four seats of the vehicle interior becomes minimum. Namely, by giving the delay amount to the reproduced sound from the rear speakers, the sound pressure levels of the reproduced sounds in the above analyzing band can be uniform at the four seats in the vehicle interior.

Processing Flow

Figure 3:
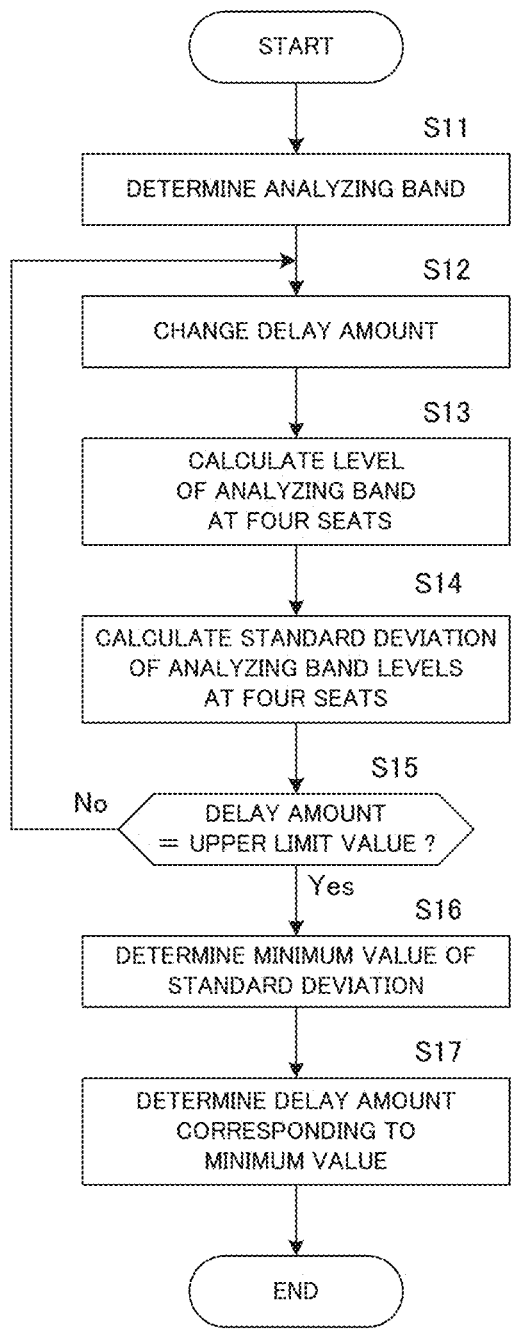
FIG. 3 is a flowchart of delay amount calculation processing according to a first embodiment.

Next, an example of the delay amount calculation processing will be described in detail. FIG. 3 is a flowchart of the delay amount calculation processing. This processing is executed by the control unit 5 which processes the signals S3 from the microphones 6 arranged at the four seats in the vehicle interior. The control unit 5 may perform this processing by executing a program prepared in advance.

First, the control unit 5 determines the analyzing band (step S11). Specifically, as described above, the control unit 5 determines the frequency band in which the reproduced sound from the front speakers and the reproduced sound from the rear speakers become reverse phases, based on the signals S3 of the sounds collected at the rear seats.

Next, the control unit 5 changes the delay amount set in the delay unit 3 (step S12). When step S12 is executed for the first time, the control unit 5 sets the delay amount to the initial value "0". Next, the control unit 5 calculates the level (hereinafter simply referred to as "the analyzing band level") of the signal S3 of the sound collected at each of the four seats in the analyzing band (step S13). Thus, the analyzing band levels at the four seats in the vehicle interior are obtained. Next, the control unit 5 calculates standard deviation of the analyzing band levels of the four seats, and stores it in an internal memory or the like (step S14).

Next, the control unit 5 determines whether or not the current delay amount has reached a predetermined upper limit value (step S15). The determination method of the upper limit value will be described later. If the delay amount has not reached the upper limit value (step S15: No), the process returns to step S12, and the control unit 5 increases the delay amount by a predetermined amount. It is desired that the width of changing the delay amount in step S12 is determined in advance.

In this way, steps S12 to S15 are repeated until the delay amount reaches the upper limit value. When the delay amount reaches the upper limit value (step S15: Yes), the process goes to step S16. In step S16, the control unit 5 determines the minimum value of the standard deviation calculated by that time in step S14 (step S16), and determines the delay amount corresponding to the minimum value (step S17). The standard deviation calculated in step 4 indicates the degree of the variation of the analyzing band levels at the four seats. The smaller the value of the standard deviation is, the more uniform the analyzing band levels of the four seats are. Therefore, by determining the delay amount corresponding to the minimum value of the standard deviation and setting it to the delay unit 3, the control unit 5 can make the analyzing band levels of the four seats in the vehicle interior most uniform.

Example of Analyzing Band Determination Processing

Next, an example of the analyzing band determination processing will be described. In the analyzing band determination processing, first the phase difference between the transmission systems of the front speakers and the rear speakers at the rear seats is calculated. Specifically, as shown in FIG. 4A, by collecting the reproduced sounds from the speakers 4FL and 4RL, arranged at the left-side in the vehicle interior, at the position of the left ear (the door-side ear) of the listener at the RL seat, the control unit 5 calculates the phase difference of the transmission systems from the front and rear speakers 4FL and 4RL on the left side to the door-side ear at the rear seat. At that time, the reproduced sounds from the front and rear speakers 4FL and 4RL have no delay (i.e., the delay amount=0). FIG. 4B shows the phase difference at the RL seat thus calculated. Similarly, by collecting the reproduced sounds from the speakers 4FR and 4RR, arranged at the right-side in the vehicle interior, at the position of the right ear (the door-side ear) of the listener at the RR seat, the control unit 5 calculates the phase difference of the transmission systems from the front and rear speakers 4FR and 4RR on the right side to the door-side ear at the rear seat. FIG. 4C shows the phase difference at the RR seat thus calculated.

In FIGS. 4B and 4C, the broken line graph (PD) shows the phase differences. Next, the phase difference is smoothed by every ⅓ octave (oct). FIGS. 4B and 4C show the graph obtained by the smoothing by the solid lines. Next, a peak and a dip having the maximum phase difference are determined in the graph obtained by the smoothing, and a center frequency of the peak and the dip is determined as a center frequency (hereinafter referred to as "an analyzing object frequency"). In the example of FIG. 4B, the center frequency C1 of the maximum peak P1 and the maximum dip D1 is determined as the analyzing object frequency. In the example of FIG. 4C, the center frequency C2 of the maximum peak P2 and the maximum dip D2 is determined as the analyzing object frequency. In the examples of FIGS. 4B and 4C, the analyzing object frequency is approximately 125 Hz, and the analyzing band is to 250 Hz.

In the above example, the analyzing band is determined by calculating the phase difference for the left and right seats in the vehicle interior, respectively. However, the analyzing band may be determined by using the phase difference of either one of the left and right seats. In the above example, while the reproduced sounds from the speakers 4FL and 4RL arranged on the left side of the vehicle interior are listened at the RL seat, the RR seat may be used as the listening position instead. Similarly, while the reproduced sounds from the speakers 4FR and 4RR arranged on the right side of the vehicle interior are listened at the RR seat, the RL seat may be used as the listening position instead.

Determination Method of Upper Limit Value of Delay Amount

Figure 5A:
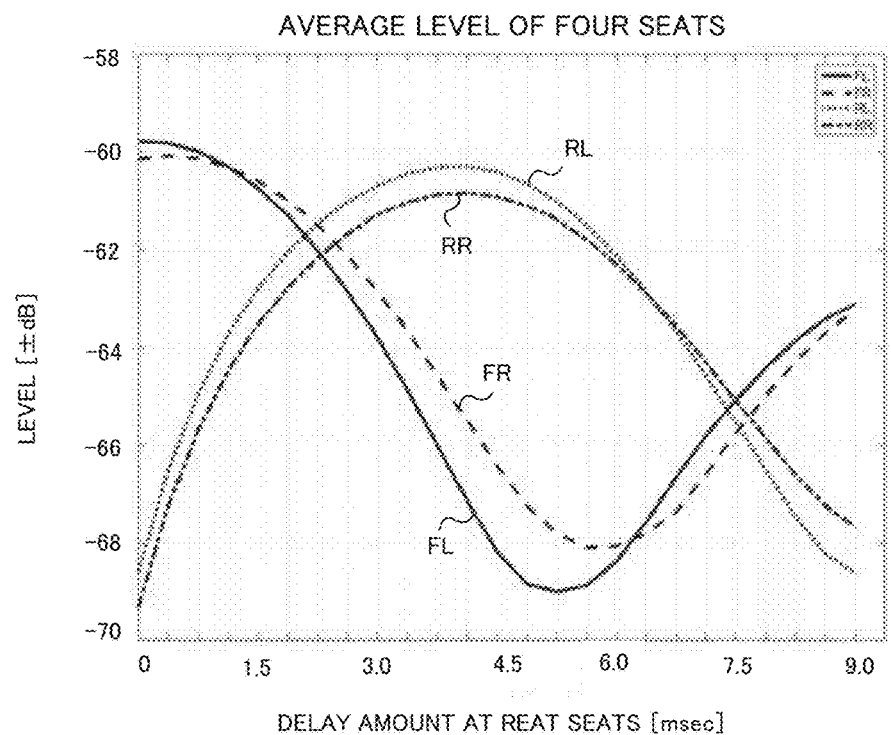
FIGS. 5A and 5B are diagrams explaining a determination method of an upper limit value of a delay amount according to the first embodiment.

Next, a determination method of the upper limit value of the delay amount will be described. Now, it is supposed that the analyzing object frequency is 125 Hz as described above. FIG. 5A shows the average sound pressure levels at the four seats in the frequency band around 100 Hz. The horizontal axis represents the delay amount of the delay unit 3, i.e., the delay amount at the rear seats with respect to the front seats, and the vertical axis represents a level. From each graph in FIG. 5A, it is understood that the level difference between the front and rear seats in the frequency band around 100 Hz varies with a period of about half wavelength of the analyzing object frequency. Therefore, if the half wavelength of the analyzing object frequency is set to the upper limit value of the delay amount, the delay amount which makes the standard deviation minimum appears at least once while changing the delay amount up to the upper limit value. Accordingly, the upper limit value of the delay amount may be calculated by the following equation.

(Upper Limit Value of Delay Amount [sec])=½× (1/Analyzing Object Frequency [Hz])

Figure 5B:
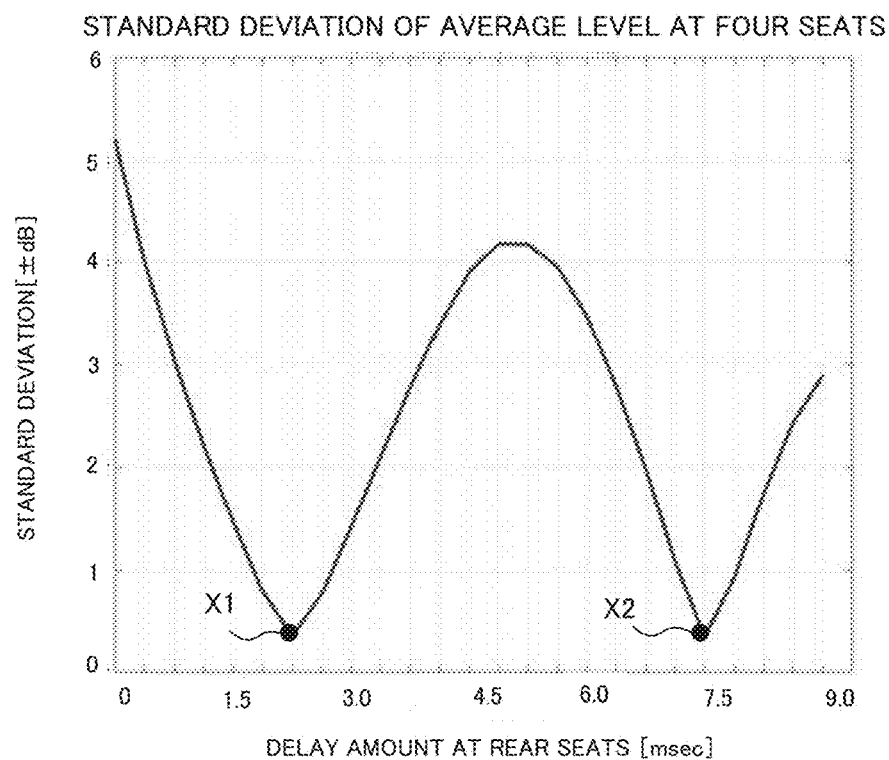

FIG. 5B shows the standard deviation value of the sound pressure levels at the four seats when the delay amount is changed from "0" to the twice of the upper limit value. The horizontal axis represents time, and the vertical axis represents the standard deviation value. From the above equation, when the analyzing object frequency is 125 Hz, the upper limit value of the delay amount becomes 4 msec. As shown, within the range up to the upper limit value 4 msec of the delay amount, there exists the point X1 at which the standard deviation becomes minimum. Within the range up to the twice of the upper limit value of the delay amount, i.e., 8 msec, there exists another point X2 at which the standard deviation become s minimum. Thus, it is understood that one delay amount which makes the standard deviation minimum can be obtained by changing the delay amount up to the upper limit value calculated by the above equation.

Effect by 1st Embodiment

Figure 6A:
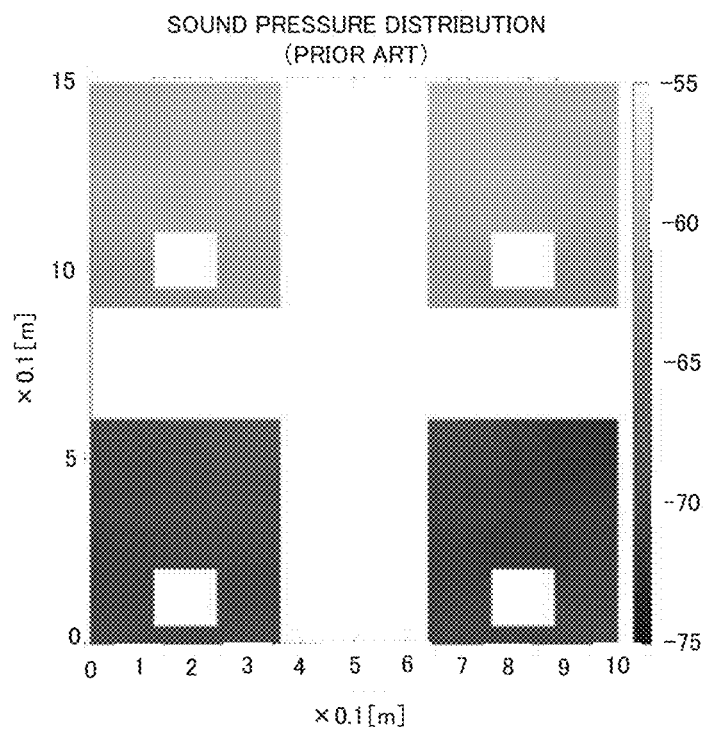
FIGS. 6A and 6B illustrate examples of sound pressure distributions in a frequency band around 100 Hz in a conventional example and the first embodiment.
Figure 6B:
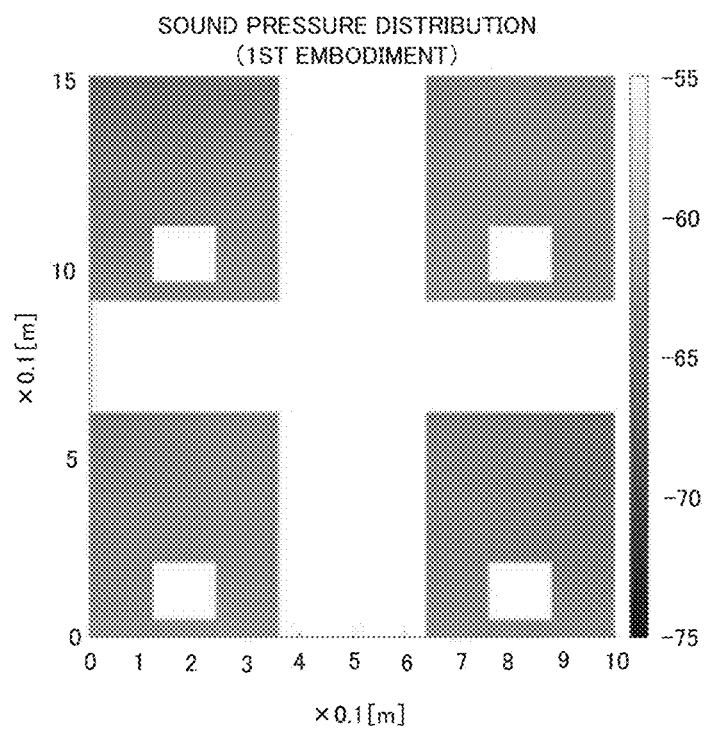

FIGS. 6A and 6B show examples of sound pressure distribution in the frequency band around 100 Hz according to the conventional example and the first embodiment. In FIGS. 6A and 6B, the color of the area becomes closer to white as the sound pressure level becomes higher, and the color of the area becomes closer to black as the sound pressure level becomes lower. FIG. 6A shows the sound pressure distribution of the four seats in a case where the sound field control of the first embodiment is not applied and the sound is reproduced from the four speakers according to the conventional method described above. In the conventional method, due to the relation of the phases of the sounds outputted from the four speakers, the sounds outputted by the front and rear speakers are overlapped (added) to increase the sound pressure level at the two front seats, and the sounds outputted by the front and rear speakers are canceled (subtracted) to decrease the sound pressure level at the two rear seats. As a result, there is a large difference between the sound pressure levels at the two front seats and the two rear seats. On the other hand, FIG. 6B shows the sound pressure distribution in a case where the sound field control of the first embodiment is applied. As shown, by the sound field control of the first embodiment, the sound pressure levels of the four seats are controlled to be substantially uniform.

Figure 7:
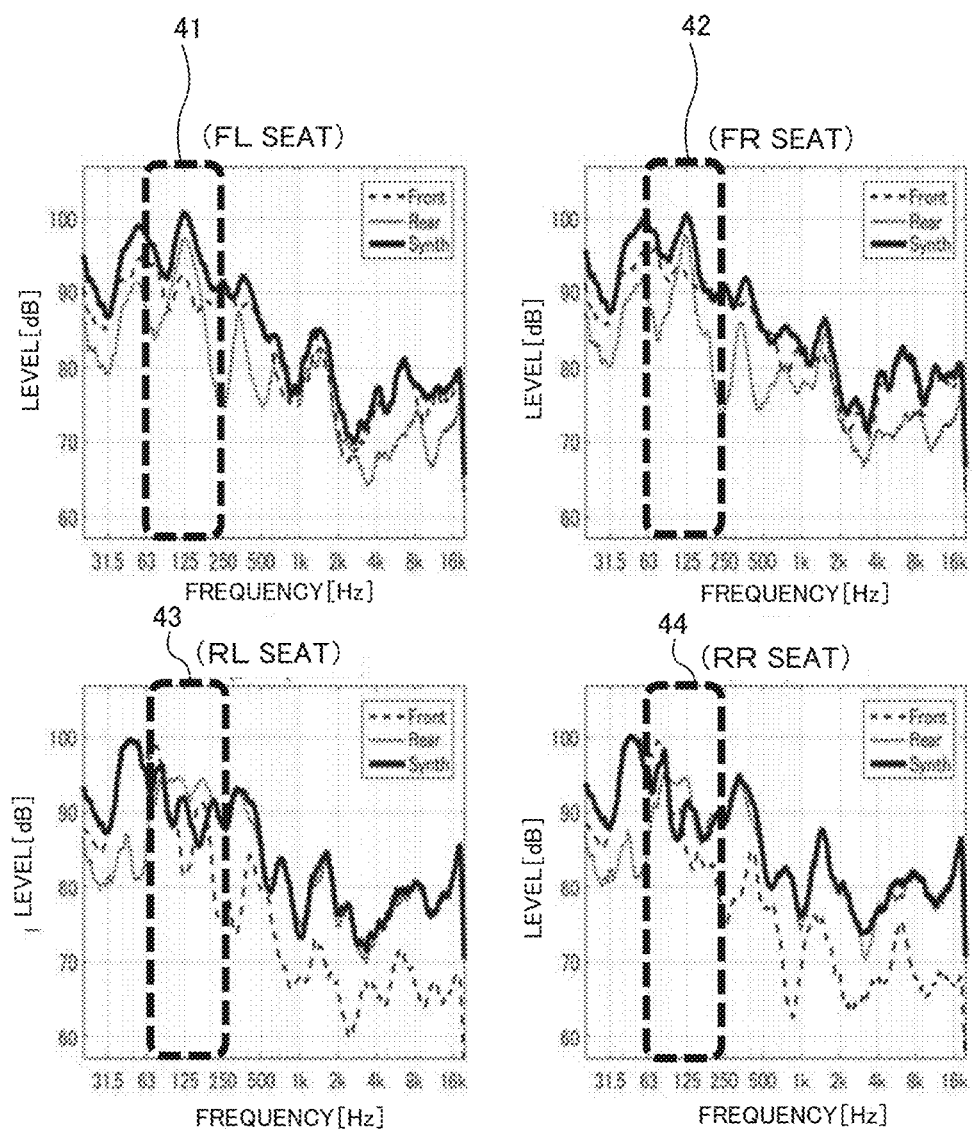
FIG. 7 illustrates frequency characteristics of sound pressure levels at four seats according to a conventional method.

FIG. 7 shows frequency characteristics of sound pressure levels at the four seats when the sound is reproduced from the four speakers according to the conventional method. As described above, around the frequency band (around 100 Hz) of the analyzing object frequency in the analyzing band (63 to 250 Hz), the phase characteristics of the reproduced sounds from the front and rear speakers become reverse phases at the rear seats. Therefore, at the front seats (the FL seat and the FR seat), the reproduced sounds from the front and rear speakers are added as shown by the broken line boxes 41 and 42, and the synthesized sound pressure level shown by the solid line increases. On the contrary, at the rear seats (the RL seat and the RR seat), the reproduced sounds from the front and rear speakers are subtracted as shown by the broken line boxes 43 and 44, and the synthesized sound pressure level shown by the solid line decreases. As a result, the sound pressure levels of the reproduced sounds in the analyzing band are largely different between the front seats and the rear seats.

Figure 8:
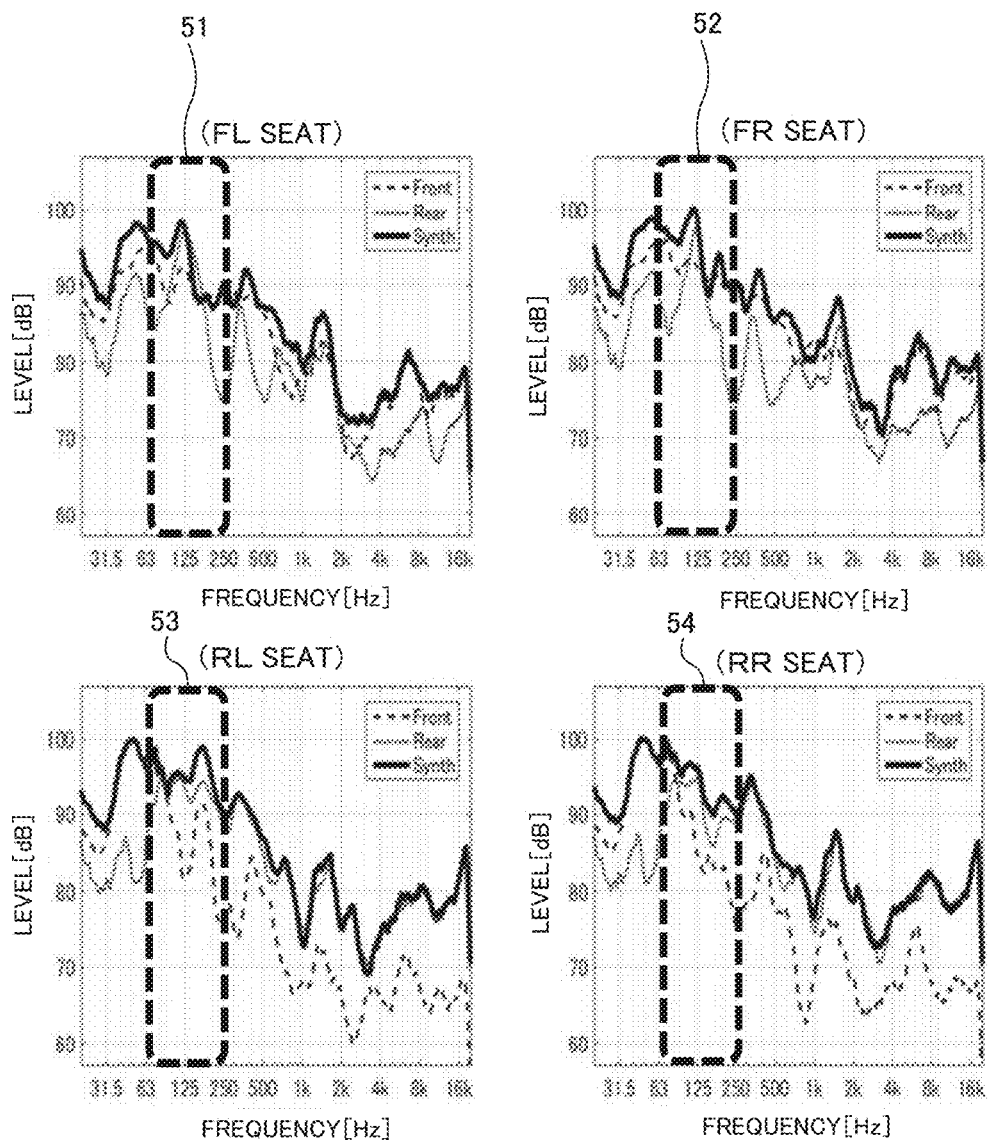
FIG. 8 illustrates frequency characteristics of sound pressure levels at four seats according to the first embodiment.

FIG. 8 shows a frequency characteristic of sound pressure levels at the four seats when the sound field control according to the first embodiment is applied and the sound is reproduced from the four speakers. As described above, the reproduced sounds from the rear speakers are delayed by the delay amount which makes the sound pressure levels at the four seats uniform. Therefore, at the rear seats (the RL seat and the RR seat), the decrease of the synthesized sound pressure level shown by the solid line is suppressed in the analyzing band as shown by the broken line boxes 53 and 54. Also, at the front seats (the FL seat and the FR seat), the synthesized sound pressure level shown by the solid line is not decreased as shown by the broken line boxes 51 and 52. Thus, it is understood that the sound fields at all seats are made uniform by the sound field control of the first embodiment.

2nd Embodiment

Next, the sound field control according to the second embodiment will be described.

Delay Amount Calculation Processing

In the second embodiment, the delay amount calculation processing roughly includes "the analyzing band determination processing" and "the delay amount calculation processing".

"The analyzing band determination processing" determines a frequency band in which the phase characteristic of the reproduced sounds outputted from the front speakers and the phase characteristic of the reproduced sounds outputted from the rear speakers become reverse phases, and is basically the same as the first embodiment. Specifically, the control unit 5 collects the reproduced sound from the front speakers and the reproduced sound from the rear speakers at the listening position at the rear seats to calculate the phase characteristics, and determines the frequency band in which those phase characteristics become reverse phases as "the analyzing band".

In the second embodiment, "the delay amount calculation processing" calculates the delay amount given to the reproduced sound from the rear speakers based on the phase difference (hereinafter referred to as "IRPD (Impulse Response Phase Difference) between the transfer function from the front speakers in the vehicle interior to a listening position at a certain seat and the transfer function from the rear speakers to the listening position at the certain seat. Here, the delay amount is calculated such that the IRPDs in the analyzing band at the four seats in the vehicle interior become minimum.

In the first embodiment, the delay amount given to the reproduced sound from the rear speakers is calculated based on the sound pressure levels at the four seats in the vehicle interior. However, the sound pressure level at each seat is easily affected by the difference of the output levels of the four speakers. In this view, in the second embodiment, the delay amount given to the reproduced sound from the rear speakers is calculated based on the IRPD, which is the phase difference at each seat. Therefore, there is such an advantage that the delay amount is hardly affected by the difference of the output levels of the four speakers.

Processing Flow

Figure 9:
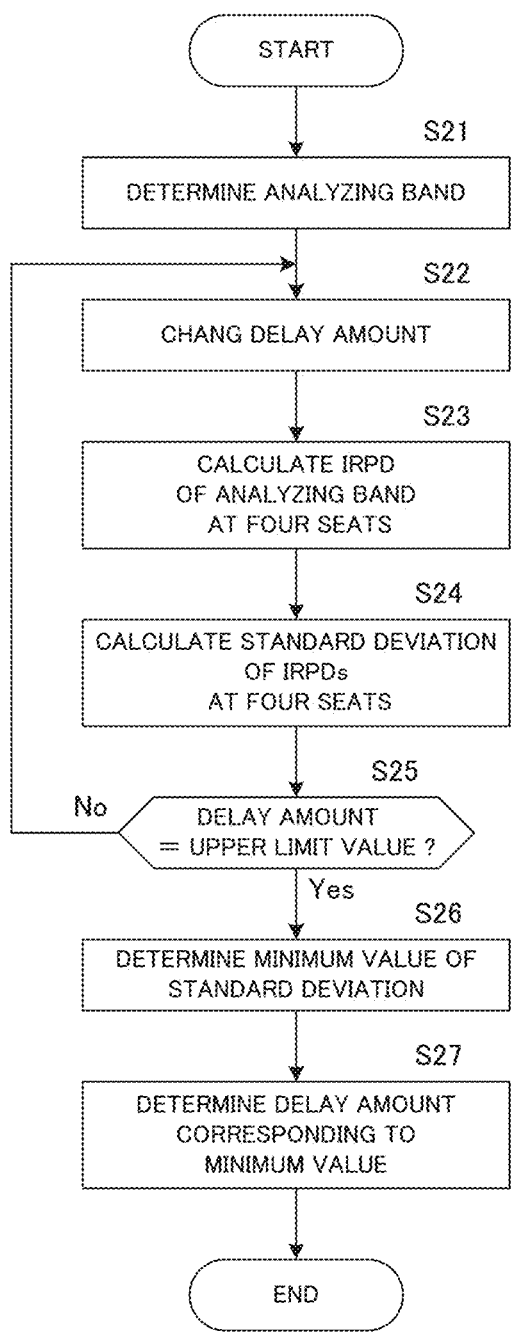
FIG. 9 is a flowchart of delay amount calculation processing according to a second embodiment.

Next, an example of the delay amount calculation processing according to the second embodiment will be described in detail. FIG. 9 is a flowchart of the delay amount calculation processing. This processing is executed by the control unit 5 which processes the signals S3 from the microphones 6 arranged at the four seats in the vehicle interior. The control unit 5 may perform this processing by executing a predetermined program.

First, the control unit 5 determines the analyzing band (step S21). The processing to determine the analyzing band is the same as the first embodiment.

Next, the control unit 5 changes the delay amount set to the delay unit 3 (step S22). When step S22 is executed for the first time, the control unit 5 sets the delay amount to the initial value "0". Next, the control unit 5 calculates the IRPDs (hereinafter referred to as "analyzing band IRPD") of the signals S3 of the sounds collected at the four seats in the analyzing band (step S23). Thus, the analyzing band IRPDs at the four seats in the vehicle interior are obtained. Next, the control unit 5 calculates the standard deviation of the analyzing band IRPDs at the four seats, and stores it in the internal memory or the like (step S24).

Next, the control unit 5 determines whether or not the current delay amount has reached the predetermined upper limit value (step S25). The method of determining the upper limit value will be described later. When the delay amount has not reached the upper limit value (step S25: No), the process returns to step S22, and the control unit 5 increases the delay amount by a predetermined value. It is desired that the width of changing the delay amount in step S22 is determined in advance.

Steps S22 to S25 are repeated in this way, and when the delay amount reaches the upper limit value (step S25: Yes), the process goes to step S26. In step S26, the control unit 5 determines the minimum value of the standard deviation calculated in step S24 by that time, and determines the delay amount corresponding to the minimum value (step S27). The standard deviation calculated in step S24 indicates the degree of the variation of the analyzing band IRPDs at the four seats for the delay amount at that time. The smaller the value of the standard deviation is, the more uniform the analyzing band IRPDs at the four seats are. Therefore, by determining the delay amount corresponding to the minimum value of the standard deviation and setting it to the delay unit 3, the control unit 5 can make the analyzing band IRPDs at the four seats in the vehicle interior most uniform.

Determination Method of Upper Limit Value of Delay Amount

Figure 10A:
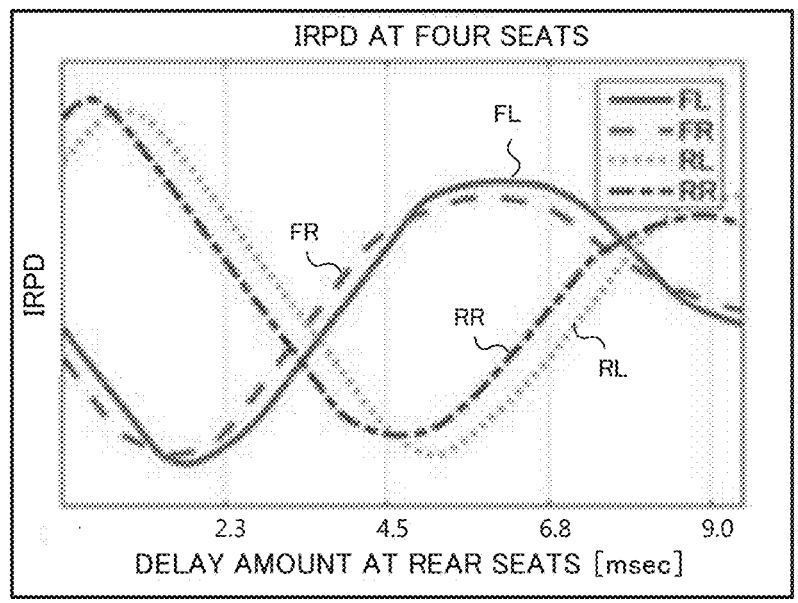
FIGS. 10A and 10B are diagrams explaining a determination method of an upper limit value of a delay amount according to the second embodiment.

Next, a determination method of the upper limit value of the delay amount will be described. Now, it is supposed that the analyzing object frequency is 125 Hz as described above. FIG. 10A shows the IRPDs at the four seats in the frequency band around 100 Hz. The horizontal axis represents the delay amount of the delay unit 3, i.e., the delay amount at the rear seat with respect to the front seat, and the vertical axis represents the IRPD. From each graph in FIG. 10A, it is understood that the difference of the IRPDs of the front and rear seats in the frequency band around 100 Hz varies with a period of about half wavelength of the analyzing object frequency. Therefore, if the half wavelength of the analyzing object frequency is set to the upper limit value of the delay amount, the delay amount which makes the standard deviation minimum appears at least once while changing the delay amount up to the upper limit value. Accordingly, the upper limit value of the delay amount may be calculated by the following equation.

(Upper Limit Value of Delay Amount [sec])=½×(1/Analyzing Object Frequency [Hz])

Figure 10B:
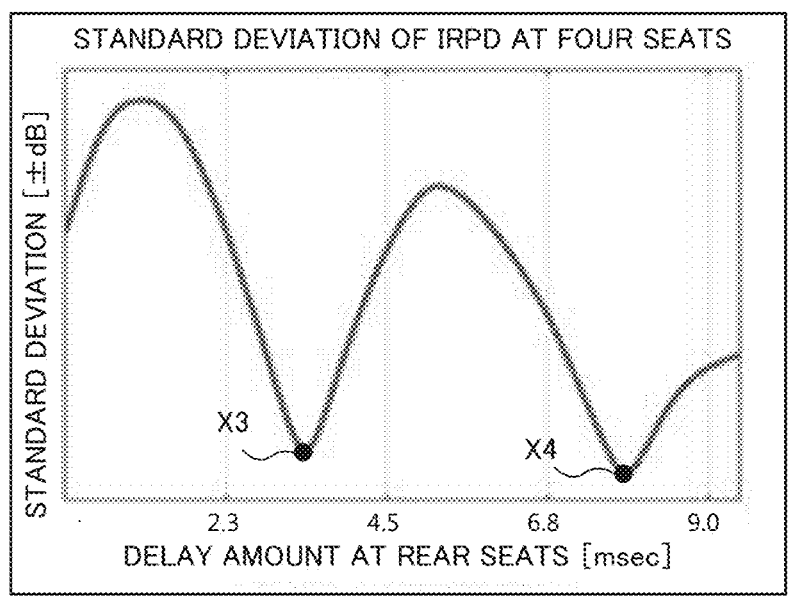

FIG. 10B shows the standard deviation value of the IRPDs at the four seats when the delay amount is changed from "0" to the twice of the upper limit value. The horizontal axis represents time, and the vertical axis represents the standard deviation value. From the above equation, when the analyzing object frequency is 125 Hz, the upper limit value of the delay amount becomes 4 msec. As shown, within the range up to the upper limit value 4 msec of the delay amount, there exists the point X3 at which the standard deviation becomes minimum. Within the range up to the twice of the upper limit value of the delay amount, i.e., 8 msec, there exists another point X4 at which the standard deviation becomes minimum. Thus, it is understood that one delay amount which makes the standard deviation minimum can be obtained by changing the delay amount up to the upper limit value calculated by the above equation.

Effect by 2nd Embodiment

Figure 11A:
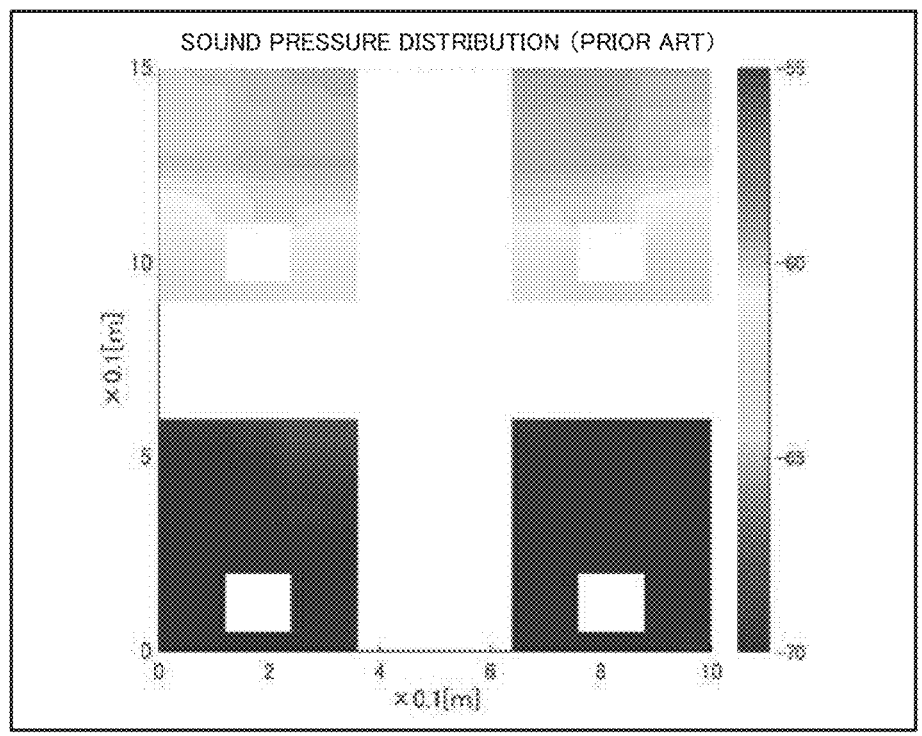
FIGS. 11A and 11B illustrate examples of sound pressure distributions in a frequency band around 100 Hz in a conventional example and the second embodiment.
Figure 11B:
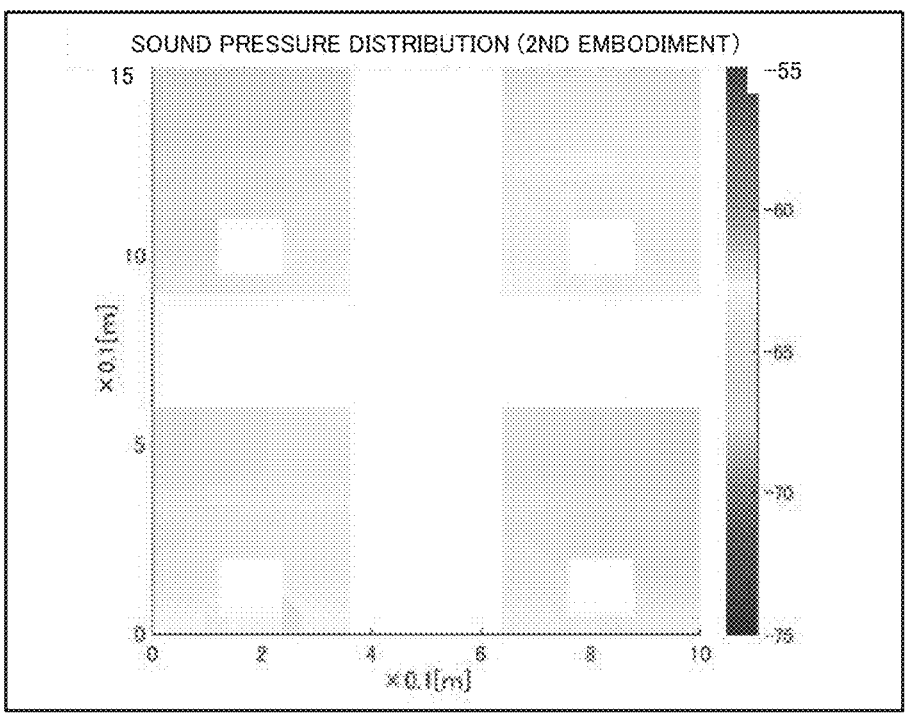

FIGS. 11A and 11B show examples of sound pressure distribution in the frequency band around 100 Hz according to the conventional example and the second embodiment. FIG. 11A shows the sound pressure distributions of the four seats in a case where the sound field control of the second embodiment is not applied and the sound is reproduced from the four speakers according to the conventional method described above. In the conventional method, due to the relation of the phases of the sounds outputted from the four speakers, the sounds outputted by the front and rear speakers are overlapped (added) to increase the sound pressure level at the two front seats, and the sounds outputted by the front and rear speakers are canceled (subtracted) to decrease the sound pressure level at the two rear seats. As a result, there is a large difference between the sound pressure levels at the two front seats and the two rear seats. On the other hand, FIG. 11B shows the sound pressure distributions in a case where the sound field control of the second embodiment is applied. As shown, by the sound field control of the second embodiment, the sound pressure levels at the four seats become substantially uniform.

Figure 12:
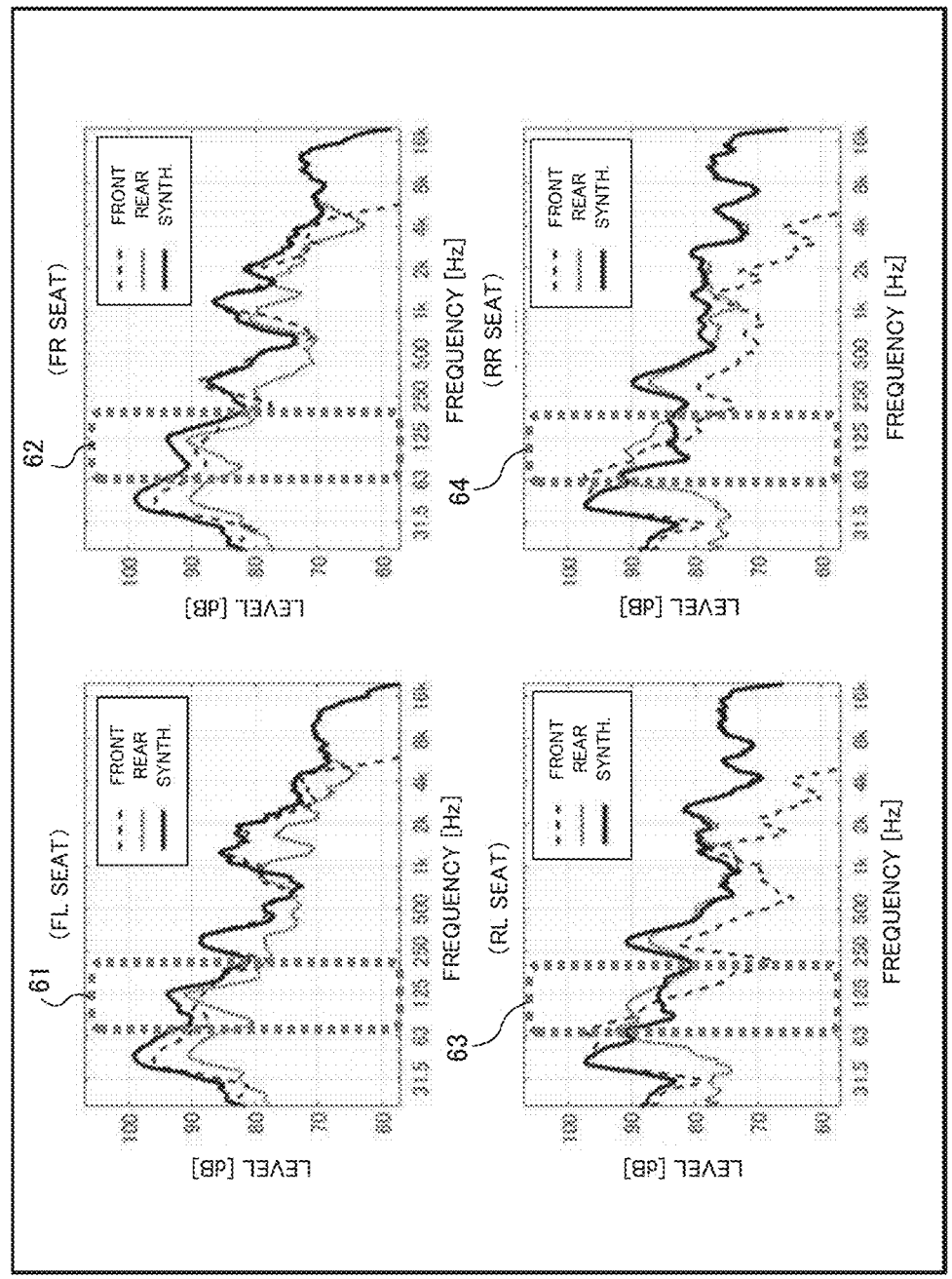
FIG. 12 illustrates frequency characteristics of sound pressure levels at four seats according to a conventional method.

FIG. 12 shows frequency characteristics of the sound pressure levels at the four seats when the sound is reproduced from the four speakers according to the conventional method. As described above, around the frequency band (around 100 Hz) of the analyzing object frequency in the analyzing band (63 to 250 Hz), the phase characteristics of the reproduced sounds from the front speakers and the rear speakers become reverse phases at the rear seats. Therefore, at the front seats (the FL seat and the FR seat), the reproduced sounds from the front speakers and the rear speakers are added as shown by the broken line boxes 61 and 62, and the synthesized sound pressure level shown by the solid line increases. On the contrary, at the rear seats (the RL seat and the RR seat), the reproduced sounds from the front speakers and the rear speakers are subtracted as shown by the broken line boxes 63 and 64, and the synthesized sound pressure level shown by the solid line decreases. As a result, the sound pressure levels of the reproduced sounds in the analyzing band are largely different between the front seats and the rear seats.

Figure 13:
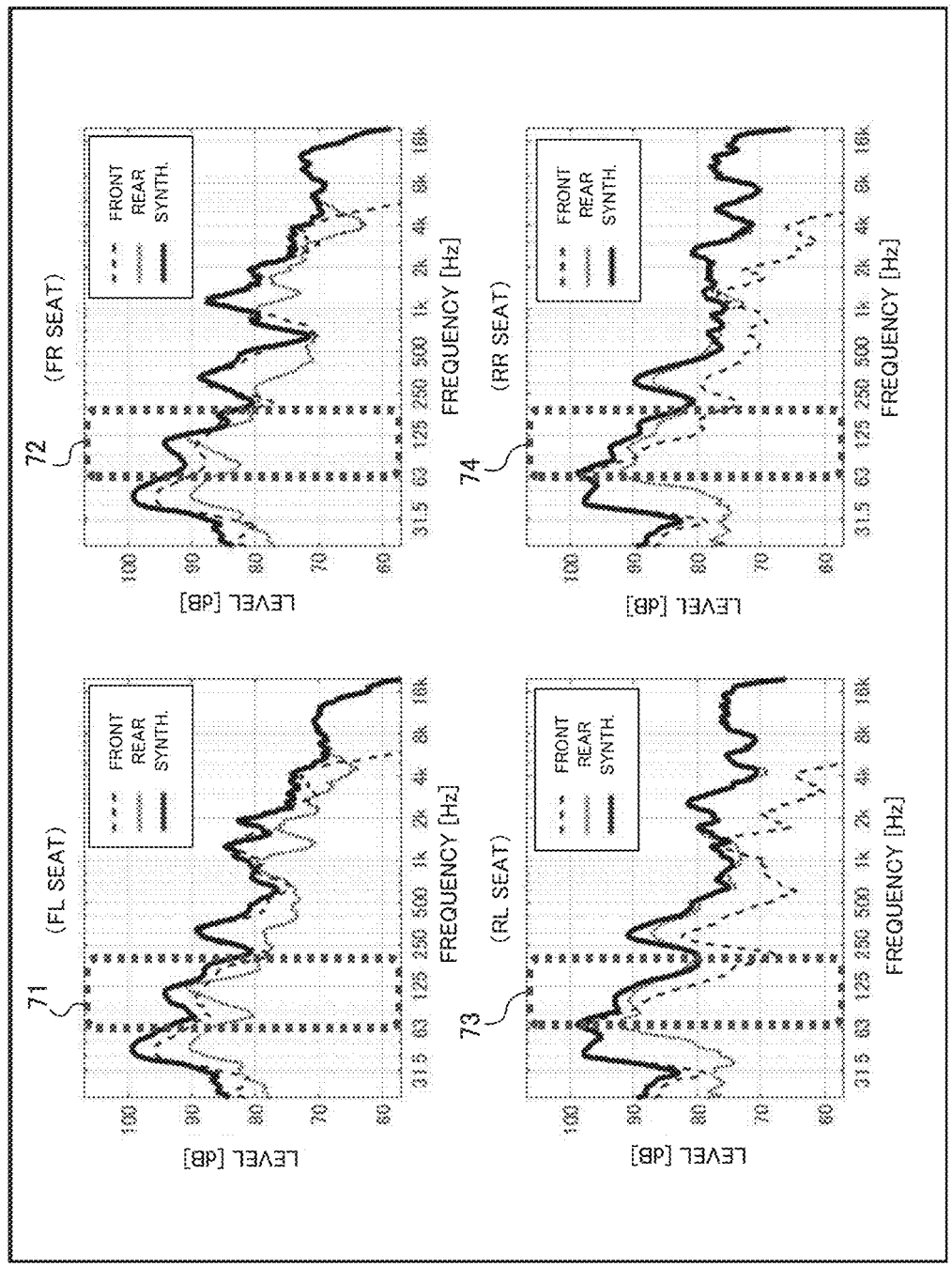
FIG. 13 illustrates frequency characteristics of sound pressure levels at four seats according to the second embodiment.

FIG. 13 shows frequency characteristics of the sound pressure levels at the four seats when the sound field control according to the second embodiment is applied and the sound is reproduced from the four speakers. As described above, the reproduced sound from the rear speakers are delayed by the delay amount which makes the IRPDs uniform at the four seats. Therefore, at the rear seats (the RL seat and the RR seat), the decrease of the synthesized sound pressure level shown by the solid line is suppressed in the analyzing band as shown by the broken line boxes 73 and 74. Also, at the front seats (the FL seat and the FR seat), the synthesized sound pressure level shown by the solid line is not decreased as shown by the broken line boxes 71 and 72. Thus, it is understood that the sound fields at all seats are made uniform by the sound field control of the second embodiment.

BRIEF DESCRIPTION OF REFERENCE NUMBERS

2 Sound source
3 Delay unit
4 Speaker
5 Control unit
10 Sound field control device

The invention claimed is:

1. A sound output control device including:
sound output units arranged at left and right front parts and left and right rear parts, each sound output unit configured to output sounds;
a signal delay unit, the signal delay unit configured to give a first delay to the sounds outputted by the sound output units arranged at the left and right rear parts;
a sound output control unit, the sound output control unit comprising a microphone configured to collect the outputted sounds at each of left and right front listening positions and left and right rear listening positions, the sound output control unit further configured to determine a delay amount based on an acoustic characteristic of the collected sounds outputted by the sound output units and then collected at each of the left and right front listening positions and the left and right rear listening positions, and set the first delay of the delay unit to the determined delay amount; and
a frequency determination unit configured to determine a controlled frequency band based on a collection result of collecting the sounds outputted by the sound output units at the rear listening positions,
wherein the sound output control unit determines the first delay based on the acoustic characteristic in the controlled frequency band, and
wherein the frequency determination unit determines, as the controlled frequency band, the frequency band in which a phase characteristic of the sounds outputted from the sound output units arranged at the left and right front parts and the phase characteristic of the sounds outputted from the sound output units arranged at the left and right rear parts become reverse phases.

2. The sound output control device according to claim 1, wherein the acoustic characteristic is a phase difference between a transfer characteristic from the sound output units arranged at the front parts to the listening positions and the transfer characteristic from the sound output units arranged at the rear parts to the listening positions.

3. The sound output control device according to claim 2, wherein the sound output control unit changes the delay amount of the signal delay unit, and determines the delay amount with which a difference between the phases detected at each of the left and right front listening positions and the left and right rear listening positions becomes minimum.

4. The sound output control device according to claim 3, wherein the sound output control unit determines the delay amount with which a standard deviation of the phase differences detected at each of the left and right front listening positions and the left and right rear listening positions becomes minimum.

5. The sound output control device according to claim 3, wherein the sound output control unit includes a predetermined maximum upper limit value, and is configured to limit changes to the delay amount of the signal delay unit to the predetermined maximum upper limit value.

6. The sound output control device according to claim 5, wherein the upper limit value is given by:

(the upper limit value of the delay amount)=½× (1/ (an analyzing object frequency)).

7. The sound output control device according to claim 1, wherein the rear listening positions are located rearward of the sound output units arranged at the left and right rear parts.

8. The sound output control device according to claim 1, loaded on a vehicle.

9. A sound output control method executed by a sound output control device including sound output units arranged at left and right front parts and left and right rear parts, each sound output unit configured to output sounds, the method including:
  a delay process to give a first delay to sounds outputted by the sound output units arranged at the left and right rear parts;
  a control process to collect the outputted sounds at each of left and right front listening positions and at left and right rear listening positions and then to determine a delay amount based on an acoustic characteristic of the collected sounds outputted by the sound output units and then collected at each of the left and right front listening positions and the left and right rear listening positions, and set the first delay in the delay process to the determined delay amount; and
  a frequency determination process to determine a controlled frequency band based on a collection result of collecting the sounds outputted by the sound output units at the rear listening positions,
  wherein the control process determines the first delay based on the acoustic characteristic in the controlled frequency band, and
  wherein the frequency determination process determines, as the controlled frequency band, the frequency band in which a phase characteristic of the sounds outputted from the sound output units arranged at the left and right front parts and the phase characteristic of the sounds outputted from the sound output units arranged at the left and right rear parts become reverse phases.

10. A non-transitory computer-readable medium storing a program executed by a sound output control device including: sound output units arranged at left and right front parts and left and right rear parts, each sound output unit configured to output sounds; and a computer, the program causing the computer to function as:
  a signal delay unit, the signal delay unit configured to give a first delay to the sounds outputted by the sound output units arranged at the left and right rear parts;
  a sound output control unit, the sound output control unit comprising a microphone configured to collect the outputted sounds at each of left and right front listening positions and left and right rear listening positions, the sound output control unit further configured to determine a delay amount based on an acoustic characteristic of the sounds outputted by the sound output units and then collected at each of the left and right front listening positions and the left and right rear listening positions, and set the first delay of the signal delay unit to the determined delay amount; and
  a frequency determination unit configured to determine a controlled frequency band based on a collection result of collecting the sounds outputted by the sound output units at the rear listening positions,
  wherein the sound output control unit determines the first delay based on the acoustic characteristic in the controlled frequency band, and
  wherein the frequency determination unit determines, as the controlled frequency band, the frequency band in which a phase characteristic of the sounds outputted from the sound output units arranged at the left and right front parts and the phase characteristic of the sounds outputted from the sound output units arranged at the left and right rear parts become reverse phases.

* * * * *